United States Patent [19]

Whitwell et al.

[11] Patent Number: 4,758,620
[45] Date of Patent: Jul. 19, 1988

[54] BLEND OF SOLVENT AND ARYLSILOXANE INTERLAYER DIELECTRIC MATERIALS

[75] Inventors: George E. Whitwell, Campbell Hall; John H. Deatcher, Lake Peekskill, both of N.Y.

[73] Assignee: Akzo America Inc., New York, N.Y.

[21] Appl. No.: 69,087

[22] Filed: Jul. 2, 1987

[51] Int. Cl.$^4$ ................................................. C08K 5/01
[52] U.S. Cl. ..................................... 524/474; 524/484; 524/588; 528/43; 106/287.12; 106/287.13; 106/287.15
[58] Field of Search ................... 528/43; 524/474, 484, 524/588; 106/287.12, 287.13, 287.15

[56] References Cited

U.S. PATENT DOCUMENTS

| | | | |
|---|---|---|---|
| 4,349,609 | 9/1982 | Takeda et al. | 428/429 |
| 4,600,685 | 7/1986 | Kitakohji et al. | 430/313 |
| 4,663,414 | 5/1987 | Estes et al. | 528/30 |

OTHER PUBLICATIONS

Hackh's Chemical Dictionary, 4th edition, 1972, p. 473.

Primary Examiner—Melvyn I. Marquis
Attorney, Agent, or Firm—Richard P. Fennelly; Louis A. Morris; Francis W. Young

[57] ABSTRACT

Striation-free interlayer dielectric films of good reflectivity are formed by spin-coating a solution comprising 1,2,4-trimethylbenzene solvent containing a dissolved arylsiloxane oligomer or polymer capable of forming an interlayer dielectric film.

5 Claims, No Drawings

BLEND OF SOLVENT AND ARYLSILOXANE INTERLAYER DIELECTRIC MATERIALS

BACKGROUND OF THE PRESENT INVENTION

The present invention is directed to an improved mixture of solvents and arylsiloxane interlayer dielectric materials which can be used to form striation-free films having good reflectivity characteristics.

DESCRIPTION OF THE PRIOR ART

Arylsiloxane interlayer dielectric materials which can be spin-coated are known to persons of ordinary skill in the art. For example, U.S. Pat. No. 4,349,609 to S. Takeda et al. mentions the use of a variety of solvents, including a mixture of cyclohexanone and toluene, a mixture of n-butyl cellosolve acetate and toluene, a mixture of isophorone and toluene, metacresol, and a mixture of n-methyl-2 pyrrolidone and N,N-dimethylacetamide. More recent U.S. Pat. No. 4,600,685 to T. Kitakohji et al. also indicates the spin-coating of organosiloxane resins to form interlayer dielectric films. This reference mentions such solvents as toluene, cyclohexane, methyl cellosolve acetate, alcohols, and ketones.

Another example of a recent U.S. patent which describes the spin-coating of arylsiloxane oligomers and polymers to form interlayer dielectric films is U.S. Pat. No. 4,663,414 to W. E. Estes et al. which indicates the use of xylene as a preferred aromatic hydrocarbon as the solvent. This patent indicates that toluene and benzyl alcohol are less preferred solvents for use in the spin-coating procedure.

SUMMARY OF THE PRESENT INVENTION

The present invention relates to the discovery that arylsiloxane oligomers or polymers can be dissolved in 1,2,4-trimethylbenzene to yield a clear solution which, when used in a spin-coating procedure, gives striation-free films that do not have reduced reflectivity.

DETAILED DESCRIPTION OF THE PRESENT INVENTION

As will be appreciated by a person of ordinary skill in the art, it is desired that interlayer dielectric films spin coated from a solvent medium be substantially free of a rippled (or striated) surface, have no substantial reduction in their reflectivity, and also be generated from substantially clear solutions. The reasons for such requirements are improved coverage of underlying features, a substantially planar surface for deposition of subsequent interconnect layers, and improved behavior in photolithographic imaging and processing. These are all necessary for the production of high density VLSICs.

In accordance with the present invention, arylsiloxane oligomers and polymers can be dissolved in a particular solvent to yield the desired clear solutions which will result in the production of substantially non-striated films that do not have any substantial reduction in their reflectivity when the solutions are used in a spin-coating procedure to form interlayer dielectric films. Representative types of arylsiloxane polymers that can be dissolved in the solvent described in connection with the present invention are well-known to persons of ordinary skill in the art and include the types of organosiloxane resins described in U.S. Pat. Nos. 4,349,609 and 4,600,685, referred to above, each of which is incorporated herein by reference.

More recent U.S. Pat. No. 4,663,414 to W. E. Eastes, which is also incorporated herein by reference, describes another type of organosiloxane material which yields phospho-boro-silanol interlayer dielectric films and which can be used in a spin-coating procedure.

Yet another type of organosiloxane oligomer or polymeric composition which can be used in conjunction with the present invention is described in co-pending U.S. Ser. No. 069,088, filed on even date herewith, entitled "Arylsiloxane/Silicate Compositions Useful as Interlayer Dielectric Films". The latter type of siloxane/silicate compositions are formed by the cohydrolyzation and cocondensation of an aryl group-containing trifunctional silanetriol, or derivative thereof, with a tetrafunctional silicic acid compound. For example, cohydrolyzed/condensed materials formed by the reaction of phenylsilanetriol and a tetraalkyl silicate, such as, tetraethyl silicate, are preferred materials in accordance with this co-pending patent application.

In accordance with the present invention, and as described in greater detail in the Example which follows, the use of 1,2,4-trimethylbenzene as a solvent for the aforementioned type of arylsiloxane oligomers or polymers results in the production of striation-free films having no substantial reduction in reflecivity when a spin-coating procedure is performed to form a thin interlayer dielectric film on a suitable semiconductor wafer. Such is not the case with other solvents, as is shown in the Example which follows. For example, the use of 1,2,3-trimethylbenzene results in poor films of very low reflectivity. Similarly, the use of 1,3,5-trimethylbenzene resulted in the formation of a striated film of reduced reflectivity.

The Example which follows sets forth certain results that were obtained when various solvents were used in a spin-coating procedure using the arylsiloxane/silicate compositions of the co-pending application.

EXAMPLE 1

The interlayer dielectric (ILD) formulation that was spun coated in the Examples which follows is described in copending U.S. Ser. No. 069,088, filed on July 2, 1987, entitled "Arylsiloxane/Silicate Compositions useful as Interlayer Dielectric Films". It comprised 74% silanol functional phenyl silicone resin (WACKER SY 430 brand), 18.5% ethyl silicate, 2.5% phenylphosphonic acid, and 5% triisopropyl borate. In this Example, the spin-coating was performed using a variety of differing solvents.

The foregoing ILD formulation was used in a generally conventional spin-coating process to form a thin film on each of a large number of essentially flat, circular, single crystal, silicon wafers having diameters ranging 2 to 4 inches. The spin-coating machine was Model No. EC-102-NRD supplied by Headway Research. The spin-coating process was carried out in a laminar flow hood with particulate filtration to 0.3 microns. The films were generated by applying about 3-3.5 grams of the formulation to a four-inch diameter wafer so as to cover about one-half of its surface area. Each wafer was then accelerated to a desired angular velocity, which was maintained for 20 to 40 seconds.

Since ILD films spun from xylene solvents (as mentioned, for example, in U.S. Pat. No. 4,663,414 to W. E. Estes et al.) frequently having a rippled (or striated) surface, a number of higher boiling solvents were used in an attempt to reduce or even eliminate such striations without sacrifice in either the reflectivity of the films or of the desired clearness of the solutions.

| Solvent Used | Observations |
| --- | --- |
| 2-methoxyethyl ether | Striation-free film of reduced reflectivity. |
| 2-methoxyethyl acetate | Striation-free film of reduced reflectivity. |
| 2-ethoxyethyl acetate | Striation-free film of reduced reflectivity. |
| Propyleneglycol methylether acetate | Reduced striations. |
| Cumene | Some degree of striations as with xylene. |
| Propylbenzene | Some degree of striations as with xylene. |
| Butylether | Did not yield a clear solution. |
| Butoxyethylether | Did not yield a clear solution. |
| 1,2,4-trimethylbenzene | Striation-free films with no reduction in reflectivity. Clear solution was formed. |
| 1,2,3-trimethylbenzene | A reflective film could not be produced. |
| 1,3,5-trimethylbenzene | A striated film of reduced reflectivity was produced. |

The foregoing is intended to illustrate certain preferred embodiments of the present invention and should not be construed in a limiting sense. The scope of protection that is sought is set forth in the claims which follow.

We claim:

1. A composition adapted to be used in the spin-coating and formation of essentially striation-free interlayer dielectric films of good reflectivity which comprises a 1,2,4-trimethylbenzene solvent containing and dissolved therein an arylsiloxane polymer useful in the formation of an interlayer dielectric film.

2. A composition as claimed in claim 1 wherein the polymer is a phospho-boro-silanol material.

3. A composition as claimed in claim 1 wherein the arylsiloxane polymer is formed by cohydrolyzation and cocondensation of a silanetriol with a tetrafunctional silicic acid compound.

4. A composition as claimed in claim 3 wherein the silanetriol is phenylsilanetriol and the silicic acid compound is a tetraalkyl silicate.

5. A composition as claimed in claim 4 wherein the tetraalkyl silicate is tetraethyl silicate.

* * * * *